United States Patent
Conway et al.

(10) Patent No.: US 6,348,155 B1
(45) Date of Patent: Feb. 19, 2002

(54) WATER PURIFICATION SYSTEM AND METHOD

(75) Inventors: David A. Conway, Plandome, NY (US); Thomas J. Smith, Meyersville, NJ (US); Peter Sorensen, Havre, MT (US); Sean Doyle, Phoenix, AZ (US)

(73) Assignee: WaterChef, Inc., Glen Head, NY (US)

( * ) Notice: Subject to any disclaimer, the term of this patent is extended or adjusted under 35 U.S.C. 154(b) by 0 days.

(21) Appl. No.: 09/183,099

(22) Filed: Oct. 30, 1998

(Under 37 CFR 1.47)

(51) Int. Cl.[7] ............................................. B01D 15/00
(52) U.S. Cl. ...................... 210/668; 210/669; 210/694; 210/748; 210/760; 210/202; 210/251; 210/259; 210/266
(58) Field of Search ................. 210/663, 668, 210/669, 694, 748, 760, 806, 202, 259, 266, 290, 502.1, 503, 251, 258; 222/189.06, 190

(56) References Cited

U.S. PATENT DOCUMENTS

| | | | | |
|---|---|---|---|---|
| 4,196,081 A | * | 4/1980 | Pavia | 210/284 |
| 4,548,716 A | * | 10/1985 | Boeve | 210/900 |
| 4,842,723 A | * | 6/1989 | Parks et al. | 210/202 |
| 5,512,178 A | | 4/1996 | Dempo | 210/638 |
| 5,597,487 A | * | 1/1997 | Vogel et al. | 210/259 |
| 5,728,305 A | | 3/1998 | Hawkinson | 210/760 |
| 5,741,416 A | | 4/1998 | Tempest, Jr. | 210/90 |

* cited by examiner

Primary Examiner—Ivars Cintins
(74) Attorney, Agent, or Firm—Collard & Roe, P.C.

(57) ABSTRACT

A system and method for purifying water in large quantities for drinking. The system comprises a housing having a water inlet, filtering means connected to the water inlet for filtering sediment and particulate matter from the water, an inlet pump to keep the water flowing through the housing at a predetermined pressure and a mixed bed multimedia unit connected to the filtering means for removing pollutants and controlling organic growth from the water. There is also an ultra-violet treatment means connected to the mixed bed multimedia unit for subjecting the water in the system to ultraviolet radiation and carbon block filtration means disposed for a final filtering prior to dispensing the water at one or more dispensing. There is also a bottle washing means provided within the housing for cleaning water bottles prior to filling with the purified water. The system can supply drinking water for entire communities, yet is portable enough to be easily transported to disaster areas.

11 Claims, 3 Drawing Sheets

WATER PURIFICATION SYSTEM AND METHOD

BACKGROUND OF THE INVENTION

1. Field of the Invention

This invention relates to a water purification system and a method for purifying water for drinking. In particular, this invention relates to a water purification system and method in which a large quantity of bathing-quality water is purified to potable water for use by entire communities.

2. The Prior Art

Contaminated drinking water is a large problem in developing countries and leads to widespread infection and disease. In nations where water is scarce, purified drinking water is often too expensive for the average citizen to buy. In addition, the quantities of purified drinking water available are limited. This situation also exists temporarily in areas that have been hit by natural disasters such as hurricanes, earthquakes, floods, etc.

In disaster areas, water is often brought to the disaster site in large containers. This method is extremely expensive and very cumbersome.

There have been many attempts to develop water purification systems capable of treating large quantities of water for drinking. Some prior methods involve purifying the water via filtration and chemical disinfectants such as chlorine. However, chemical disinfectants can have harmful side effects as well, and some, such as chlorine, can lead to the formation of carcinogens.

One attempted solution to this problem is disclosed in U. S. Pat. No. 5,741,416, to Tempest, Jr. This patent discloses a water purification system having a filter, a means for oxidizing organic substances in the water, a disinfecting means and an antiviral means. a mechanism for coagulating colloidal particles, and a chemical disinfectant. Other water purification systems are disclosed in U.S. Pat. No. 5,728,305 to Hawkinson and U.S. Pat. No. 5,512,178 to Dempo.

While there are many systems that can convert contaminated water into potable water, many of these systems use harmful chemicals or are not easily transported to disaster sites. In addition, none of the prior art systems provide a method for the people needing the water to collect the water in a sanitary manner from the treatment system.

SUMMARY OF THE INVENTION

It is therefore an object of the present invention to provide a water purification system that converts contaminated water to potable water in an inexpensive and simple manner.

It is another object of the invention to provide a water purification system that does not add any potentially harmful chemicals to the water.

It is another object of the invention to provide a water purification system that has means for allowing the people in need of the water to carry the water away in a sanitary manner.

It is a further object of the present invention to provide a water purification system that can be easily transported to an area in need.

These and other objects of the invention are accomplished by a water purification system comprising a housing, a water inlet, filtering means for filtering sediment and particulate matter from the water, an inlet pump for keeping the water flowing through the housing at a predetermined pressure and a mixed bed multimedia unit for removing pollutants and controlling organic growth from the water. There is also an ultra-violet treatment means for subjecting the water in the system to ultraviolet radiation, carbon block filtration means for filtering the water of organic material, and at least one means for washing a water bottle dispensed within the housing and there is an ozone treatment following the UV treatment which effectively destroys any residual bacteria or organics. The filtered water is then pumped through a dispensing means to dispense the water into the washed bottles.

The filtering means is preferably comprised of a macrofiltration unit and a microfiltration unit. The macrofiltration unit is connected at the input of the water conduit, before the water is pumped through the inlet pump. The macrofiltration unit is essentially a strainer to remove sediment and particulate matter larger than 80 microns. Preferably, this unit is visible from the outside of the housing so that the filter can be observed for maintenance. A macrofiltration unit is necessary to protect pumps, valves and other components from damage, malfunctions and a shortened life.

The microfiltration unit is a cartridge filter and removes particulate matter and sediment as small as 10 microns and possibly as small as 0.35 microns. One microfilter may be used, or several may be placed in series. The inlet pump is necessary to keep the inlet water flowing at 60 psi. The inlet pump is preferably arranged between the macrofiltration unit and the microfiltration unit.

The mixed bed multimedia filter follows the microfiltration unit and is a cartridge containing granular activated carbon, quartz, and a granulated copper-zinc material. The quartz acts as a distribution media and the carbon removes organics, taste, odors and soluble particulates from the water. The copper-zinc material is used for its galvanic action to remove chlorine, heavy metals, bacteria, algae and fungi. A suitable copper-zinc material for the mixed-bed multimedia unit is sold by KDF, under the name KDF55. Both the microfiltration unit and the mixed-bed multimedia unit must be replaced when the pressure drop across the filter reaches a predetermined level.

The ultraviolet treatment unit follows the mixed-bed multimedia unit and comprises a UV bulb that emits intense ultraviolet light. The ultraviolet radiation destroys any microorganisms and bacteria that may be present in the water.

The ozone treatment follows the UV treatment and is created via a corona arc across an air stream. The ozone laden air is then injected via a spray nozzle into the water. Ozone removes organics and microorganisms in the water. It is a powerful oxidizer that imparts disinfectant treatment to the water. Ozone destroys bacteria and viruses, oxidizes heavy metals and eliminates unpleasant odors. Ozone converts back to oxygen after a few hours. If the water is to be consumed immediately after ozone treatment, the ozone must be removed from the water as it causes nausea in some people.

The water is dispensed from the housing with the aid of a dispensing pump to ensure constant pressure at the discharge dispenser heads. There are preferably several heads for dispensing the water within each housing.

The carbon block filtration unit comprises a carbon block filter cartridge that forces any remaining particulate and dissolved organic compounds to be retained as a final purification. This step also removes any residual ozone. This filtration unit is preferably arranged after the dispensing pump just prior to the dispensing heads.

Also connected to the dispensing pump is a parallel piping circuit that leads to one or more bottle washing stations. The bottle washing stations are set up to wash bottles with 1" to 2.5" diameter openings. There is a cleaning liquid spray nozzle that sprays a detergent upwards into an inverted bottle. The detergent then drains out of the bottle into a drain in the housing. The bottle is then rinsed with purified water, either manually, or with an automatic inverted nozzle as well. This washing action can be initiated automatically upon placing a bottle onto the nozzle, or it can be started with a push button. The washing cycle includes a wash, drain and rinse cycle that is accomplished in 10 to 30 seconds, at which time the bottle is removed from the washing station and is ready for filling with water at the dispensing station. The drain is sent to a sewer for post treatment to comply with local regulations.

There is preferably a back-up power generator within the housing and connected to the inlet pump, dispensing pump, UV treatment, ozone treatment and detergent mixer for supplying power during a power failure.

The system according to the present invention takes bathing grade water and purifies it into drinking water in a simple and economic manner. The system according to the present invention can supply safe drinking water to an entire village at low cost and with low maintenance. The system is easily transported via a trailer or helicopter to the desired location. There are preferably two bottle washing stations and four dispensing heads, so that several people can receive water at one time. The system is equipped to supply about 5,000–20,000 gallons of potable water per day, with the 5,000 gpd version able to supply the daily drinking water needs of about 2,000–3,000 people. Different inlet water compositions can be accommodated by changing the individual component design capacities to achieve the optimum quantities of purified water.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
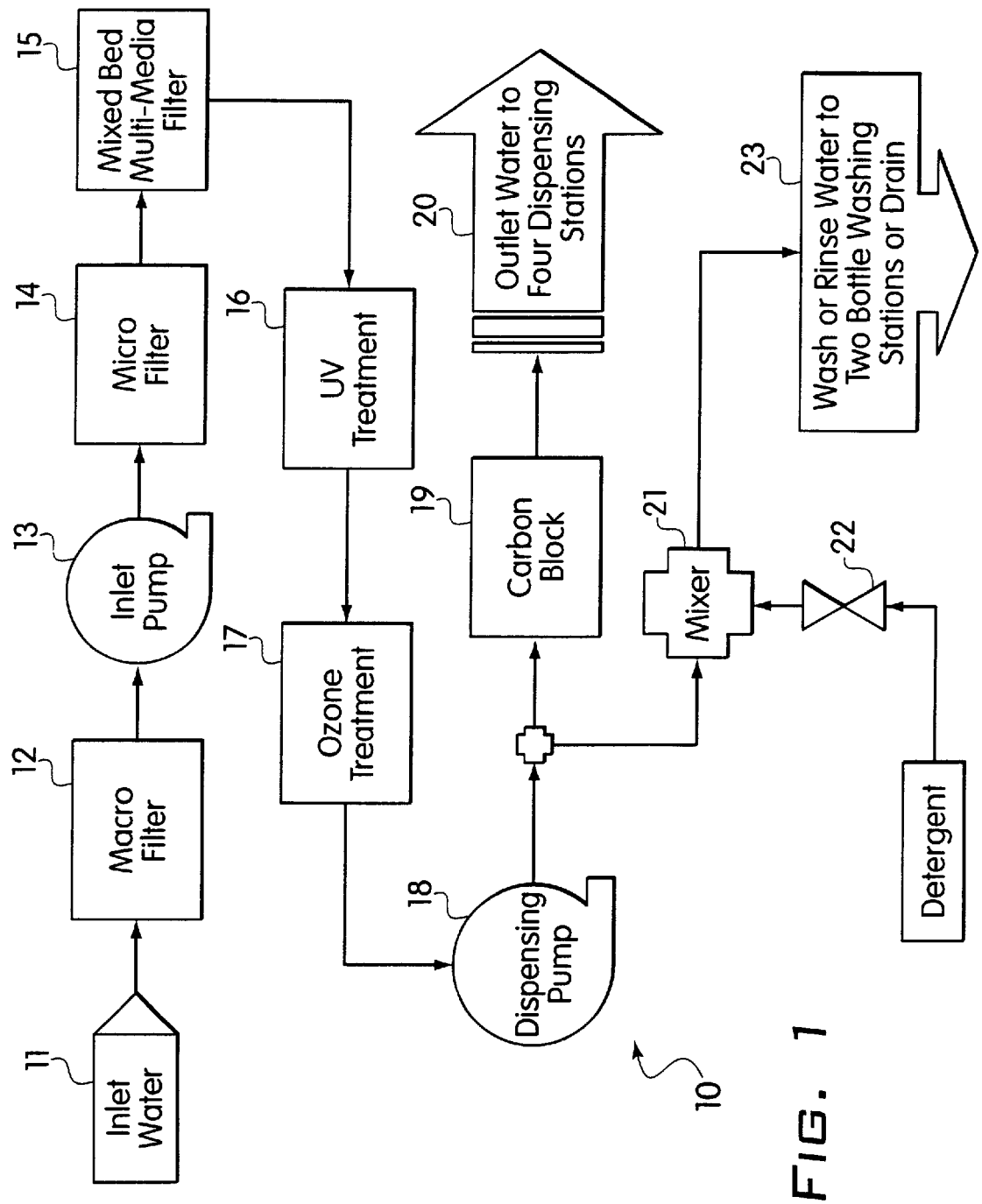
FIG. 1 shows a block diagram of the components of the water purification system according to the invention.

Referring now in detail to the drawings and, in particular, FIG. 1 shows a block diagram of all of the components of the system 10 according to the invention. Water from a local source such as a well is piped in to system 10 through inlet 11 and then through macrofilter 12 to filter out sediment and large particles. A suitable macrofilter is the R30BB Ametek 30u unit. The water then travels through an inlet pump 13, which maintains the water in the system at 60 psi, which is the optimal pressure for the water purification system according to the invention. The inlet pump 13 is preferably a 2 horsepower 75 psig pump. After pump 13, the water then travels through a microfilter 14 to filter out smaller particles. A suitable microfilter for this purpose is the CPSBB Ametek filter. The water then travels from microfilter 14 to mixed-bed multimedia filter 15, which is a mixture of carbon, quartz and granular Copper-Zinc material, such as the KDF55. After mixed-bed multimedia filter 15, the water is subjected to ultraviolet radiation by UV treatment 16, consisting of an ultraviolet bulb such as made by Pur Guard. Then the water is subjected to ozone treatment 17 to further purify the water. The water then travels through dispensing pump 18, which is preferably a 1 horsepower 50 psi pump. Macrofilter 12, inlet pump 13, microfilter 14, mixed-bed multimedia filter 15, UV treatment 16, ozone treatment 17 and dispensing pump 18 are all commercially available and known in the art and are not described in detail here.

After dispensing pump 18, the water travels through a final carbon block filter 19 and then out to one or more dispensing stations 20. Also after pump 18, there is a parallel water conduit that leads to a mixer 21, which receives a detergent pumped through detergent pump 22 for washing bottles in a bottle washing station 23 prior to receiving purified water from dispensing stations 20.

Figure 2:
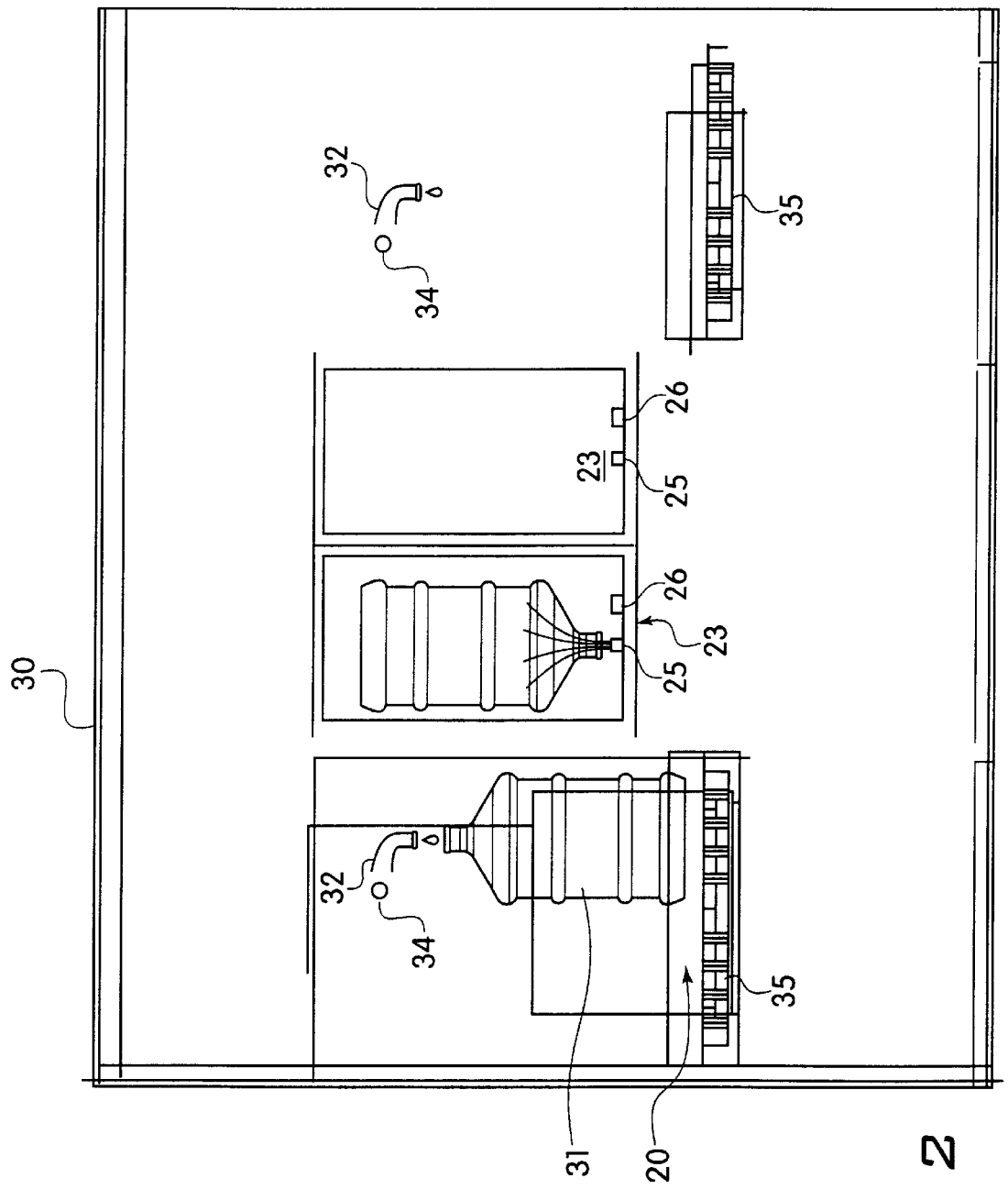
FIG. 2 shows a front view of the water purification system according to the invention.
Figure 3:
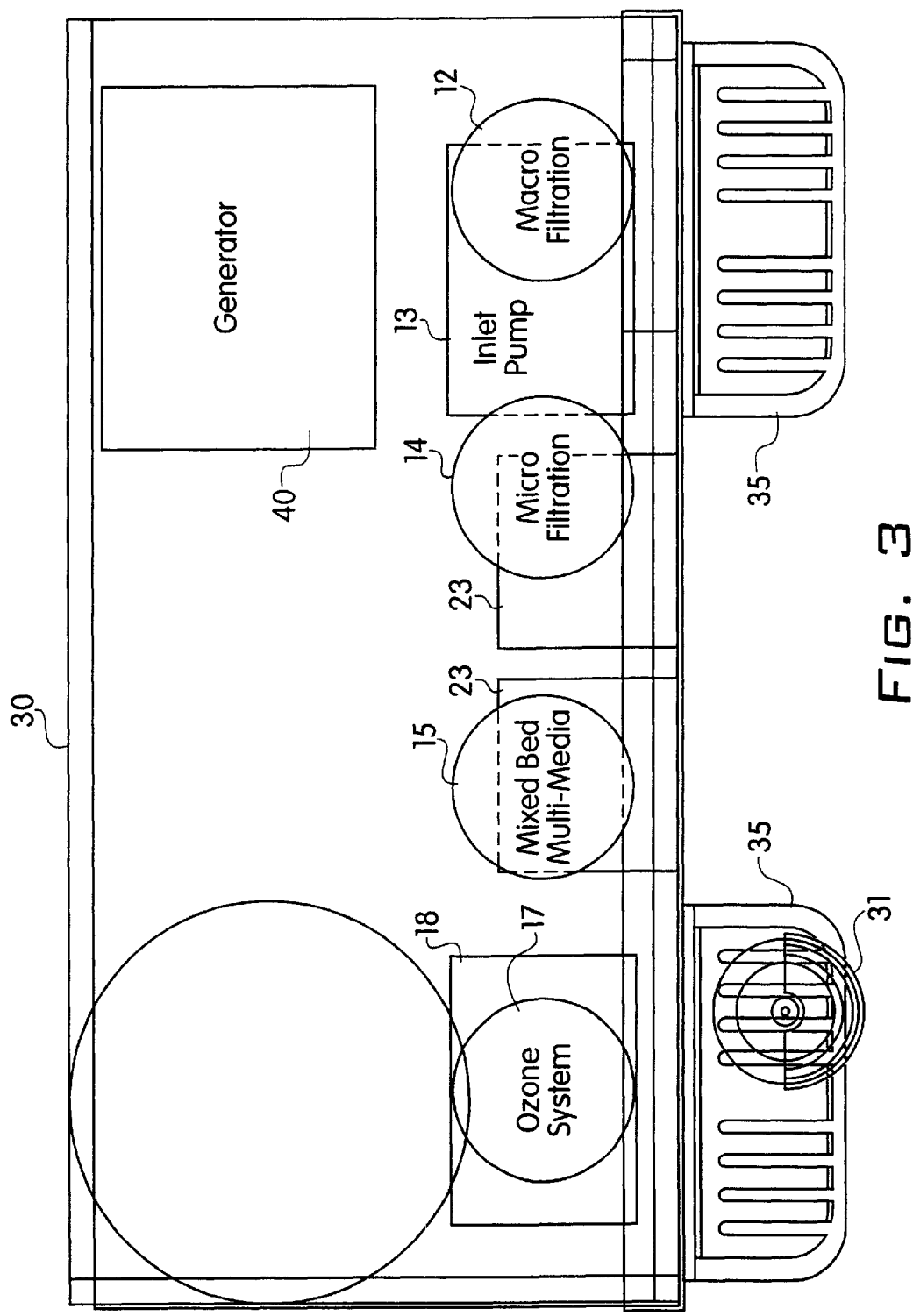
FIG. 3 shows a top cross-sectional view of the water purification system according to the invention.

The physical layout of system 10 is shown in FIGS. 2 and 3. System 10 is enclosed in a housing 30 to which users approach when desiring purified water. Dispensing heads 32 dispense purified water into bottles 31 at dispensing station 20 by pressing a button 34. There is a shelf drain 35 underneath each dispensing head to catch drips and spills. There are two bottle washing stations 23 located in housing 30. As shown, bottle 31 is inverted over detergent pump 25, which sprays a predetermined amount of detergent mixture into bottle 31 to clean it. The detergent mixture then drains out of bottle 31. Then, bottle 31 is placed over water pump 26, which sprays ozonated water into bottle 31 in the same manner to rinse bottle 31 of detergent. Once, washed, the bottles are ready to receive purified water from dispensing heads 32.

The components of system 10 are shown in FIG. 3, except for the UV treatment 16 and carbon block filter 19, which are located directly underneath ozone treatment. In general, system 10 is powered by the local power supply. However, as shown in FIG. 3, there is a backup generator 40, which can supply power to system 10 in the event that regular local power fails. Generator 40 is commercially available and can be any suitable generator. An example of an acceptable generator is a 220 volt 5 kilowatt John Deere gasoline powered generator.

Accordingly, while only a single embodiment of the present invention has been shown and described, it is obvious that many changes and modifications may be made thereunto without departing from the spirit and scope of the invention.

What is claimed is:

1. A system for purifying water, comprising:

a housing;

a water inlet for receiving water to be purified into the housing;

filtering means connected to the water inlet for filtering sediment and particulate matter from the water;

an inlet pump connected to said filtering means within the housing, said pump adapted to keep the water flowing through the housing at a predetermined pressure;

a mixed bed multimedia unit connected to the filtering means within the housing for removing pollutants and controlling organic growth from the water, said mixed bed multimedia unit comprising granular activated carbon, quartz and a granular material containing copper and zinc;

ultraviolet treatment means connected to the mixed bed multimedia unit within the housing for subjecting the water in the system to ultraviolet radiation;

carbon block filtration means disposed within the housing for filtering the water organic material;

at least one means for washing a water container disposed within the housing; and dispensing means within the housing for dispensing purified water into the washed container.

2. The system according to claim 1, further comprising an ozone treatment system connected to the ultraviolet treatment means for eliminating bacteria and viruses in the water.

3. The system according to claim 1, wherein the means for washing a water container comprises:

a detergent spray apparatus that sprays a predetermined amount of detergent upwards into an inverted bottle; and a rinsing spray apparatus that sprays a predetermined amount of rinsing water upwards into an inverted bottle to rinse the bottle of any detergent.

4. The system according to claim 1, further comprising a back-up power generator within the housing and for supplying power to the system during a power failure.

5. The system according to claim 1, wherein the dispensing means comprises a dispensing pump and at least one dispensing head.

6. The system according to claim 5, wherein said dispensing means comprises four dispensing heads.

7. The system according to claim 1, wherein the filtering means comprises a macrofilter disposed between the inlet and the inlet pump for filtering out sediment and large particles, and a microfilter disposed between the inlet pump and the mixed bed multimedia unit for filtering out dissolved particulate matter.

8. The system according to claim 7, wherein the macrofilter is a strainer that removes sediment and particulates larger than 80 microns.

9. The style according to claim 1, wherein the inlet pump is adapted to keep the water flowing at 60 psi.

10. A method of purifying and dispensing drinking water, comprising:

pumping water though a macrofilter to eliminate sediment and particulate matter;

pumping the water through a microfilter to filter dissolved particulate matter;

pumping the water through a mixed-bed multimedia unit comprising granular activated carbon, quartz and a granular material containing copper and zinc to remove chlorine, organics, taste, odors, heavy metals, pollutants, bacteria, algae and fungi;

subjecting the water to ultraviolet radiation to destroy microorganisms and bacteria;

pumping ozonated air through the water to further destroy microorganisms;

pumping the water through a carbon filter to further remove any dissolved organic compounds and particulate matter; and dispensing the water into bottles.

11. The method according to claim 10, further comprising washing the bottles with an automatic bottle washer prior to the step of dispensing the water.

\* \* \* \* \*